Dec. 11, 1951  R. L. JONES ET AL  2,577,895
DRILLING APPARATUS AND METHOD OF CLEANING PLUGGED DRILL STEEL
Filed Jan. 15, 1948

INVENTORS.
Robert L. Jones
& Harry O. Nylene
By Lamphere and Van Valkenburgh
ATTORNEYS Patented Dec. 11, 1951

2,577,895

UNITED STATES PATENT OFFICE 2,577,895

DRILLING APPARATUS AND METHOD OF CLEANING PLUGGED DRILL STEEL

Robert L. Jones and Harry O. Nylene,
Leadville, Colo.

Application January 15, 1948, Serial No. 2,457

9 Claims. (Cl. 255—64)

This invention relates to drilling apparatus and more particularly to an improved device for and method of removing material obstructing or plugging the passage of a drill shank or drill steel, used in drilling apparatus.

In percussion drilling apparatus, a length of rod commonly called a "drill steel" is employed, such drill steel having at its outer end a bit which may be formed integrally with the shank or drill steel, or formed separately so as to be detachable therefrom. The end of the drill steel opposite the bit is inserted in a chuck or other suitable holder of percussion drilling apparatus or impact machine such as, for example, a liner, stoper or jack hammer, used in mining or similar operations where holes are to be drilled in hard substances of the earth such as rock or ore. Successive impacts on the drill steel causes the bit to produce a hole in the material being drilled, and for producing such impacts, the drilling apparatus usually includes an air motor operated by air under pressure. During drilling, dust tends to be produced, and the bit also tends to be heated due to the impacts. To eliminate such dust and to cool the bit, a fluid such as water is conducted under pressure to the bit through a passage extending centrally through the drill steel or shank. This passage often becomes clogged by rock particles or cuttings forced therein during drilling, and particularly when the bit is operating on relatively soft rock and a considerable quantity of material is being removed. When the passage becomes clogged, the material therein is usually very firmly packed and consequently extremely difficult to remove, not only because of the packing, but also because of the small size of the passage. The usual practice is to replace the drill steel and take the plugged drill steel to a shop or the like, at which attempts are made to remove the material, as by a small auger (which is useless when the drill steel is of any considerable length), by hammering the drill steel, or by tapping the drill steel on a hard surface such as iron. Sometimes the plugged material can be removed, after considerable effort, if the material is not packed too tightly, but often it is impossible by any methods heretofore employed to clear the passage, and consequently the drill steel is no longer useful and must be discarded, which is, of course, costly.

One of the objects of this invention is to provide a new and efficient device for and method of quickly removing material plugging the passage of a drill steel and the like.

Another object of this invention is to provide a device and method whereby percussion drilling apparatus or impact machine can be employed in quickly cleaning a plugged drill steel passage.

Still another object is to provide a device to be utilized in association with normal drilling apparatus or impact machine, to enable an operator to utilize the drilling apparatus in quickly cleaning a plugged drill steel passage.

A further object is to so construct the device employed in cleaning the plugged drill steel passage, that the cooling water supply can be employed to cool the device during the cleaning operation.

A still further object is to provide means for cleaning a plugged drill steel passage, which can be made a part of the drilling apparatus or impact machine, so that the cleaning operation can be performed without removal of the drill steel from the chuck of the drilling apparatus.

Additional objects and the novel features of this invention will become apparent from the following description, taken in connection with the accompanying drawing, in which.

Figure 1:
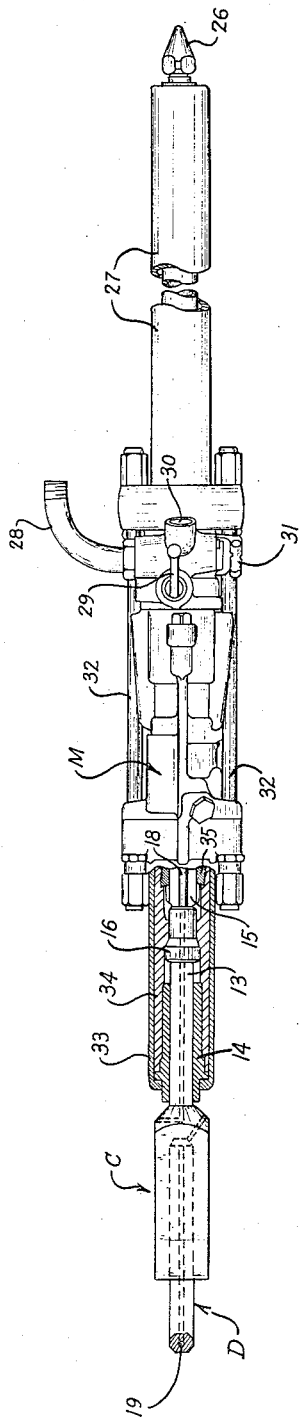
Fig. 1 is a side view of an impact machine such as a stoper, and in association therewith, a device constructed in accordance with this invention.
Figure 2:
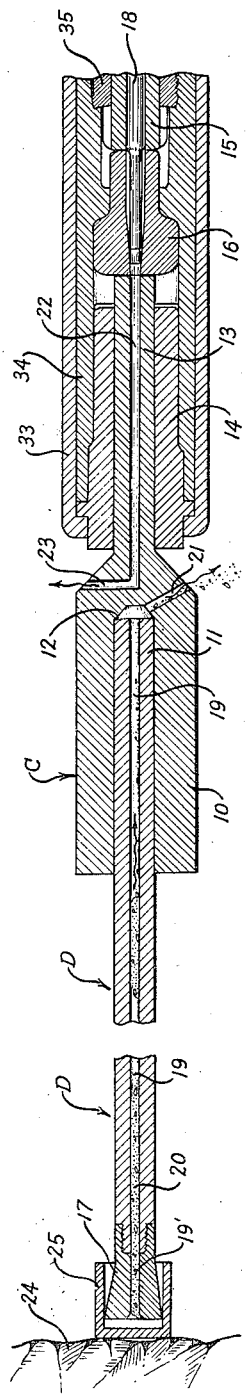
Fig. 2 is a partial longitudinal section, on an enlarged scale, illustrating the use of the device in removing foreign material and the like from a drill steel.
Figure 3:
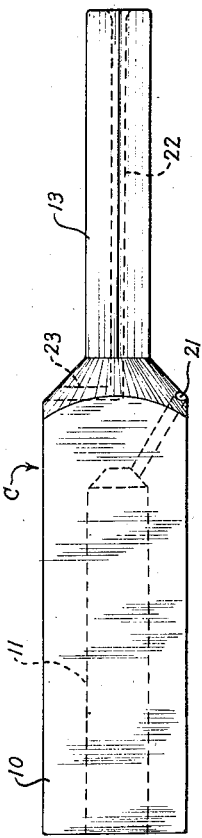
Fig. 3 is a further enlarged side view of the device.

As illustrated in the drawing, the device of this invention may comprise a chuck C, provided with a relatively heavy body 10, which may be rectangular, hexagonal, round, or any other shape, and having therein a socket 11 adapted to receive the shank or impact-receiving end 12 of a drill steel D. The chuck C is preferably made of steel or similar material, forged or similarly produced, to provide adequate resistance to long wear and rough usage. Preferably formed integrally with the body 10, is a rearwardly extending shank 13, adapted to be inserted within the chuck 14 of a percussion or impact machine M, illustrated as a stoper, but which may be a liner, air hammer, or the like, or other type of impact machine. During normal drilling operations, the drill steel D is inserted in the chuck 14, and successive impacts are produced against the end 12 thereof by a reciprocating hammer 15, acting through a tappet 16. The chuck 14 may be turned or rotated in a conventional manner, so that a hole will be drilled in the rock by a bit 17, which may be detachable from the drill steel, as shown, or may be formed integrally with the drill steel. During drilling, water for flushing out the cuttings is supplied by a tube 18 to a central passage 19, extending longitudinally of the drill steel D and having a continuation 19' in the bit 17. However, particularly when drilling in soft rock, the passages 19 and 19' tend to become clogged or plugged with dirt, cuttings or other foreign material 20, thus preventing the free flow of water or flushing fluid to the bit. This, of course, interferes seriously with the drilling operation, and, as indicated above, it has heretofore been relatively difficult to remove such foreign material, the drill steel even sometimes being discarded because of such difficulty.

In cleaning out the drill steel passage 19 (and/or bit passage 19'), in accordance with this invention, successive impacts are produced against the impact end 12 of the drill steel D, while the cooling and flushing water is turned off or, preferably, diverted from the normal passage 19, while the bit 17 is shielded from contact with rock or the like to prevent the production of additional material which would tend to add to that already plugging the passage. For the above purpose, the shank 13 of the chuck C is placed in the chuck 14 of the percussion machine M, while the impact end 12 of the drill steel D is placed in the socket 11 of the chuck C. After the bit 17 has been positioned against a solid wall or object, preferably a metal plate or the like so that no actual drilling will take place during cleaning, the percussion or impact machine M is turned on and the foreign material 20, due to impact and vibration, is caused to move rearwardly in central passage 19. As soon as the foreign material reaches the impact end 12 of the drill steel, it is discharged through a discharge passage or hole 21, formed in body 10 of the chuck C and leading from the rear end of socket 11. At the same time, the water or flushing fluid, which normally acts also to cool the bit 17, is diverted through a central passage 22 in shank 13 of the chuck C, and is discharged through an outlet 23, the passage 22 and outlet 23 forming a by-pass for the flushing fluid. The passage 22 preferably extends to a point adjacent the socket 11, so that the water will tend to keep the chuck C cool during the cleaning operation. To avoid drilling into the rock 24 during cleaning, a special cap 25, formed of steel or the like and adapted to fit over the bit 17, may be utilized. It is to be emphasized that during the cleaning operation in accordance with this invention, the foreign material 20 moves toward the rear end of the drill steel, rather than being removed at the front end, at which it entered. A possible explanation of such movement of the foreign material is that, as each successive impact is received by the drill steel, the inertia of the foreign material causes it to move rearwardly in the central passage 19. However, whatever the explanation, a drill steel which has been completely plugged may be cleaned in a relatively short period of time, such as from a few seconds to a minute or more.

The remainder of the percussion or impact machine M may be conventional, the machine illustrated being a stoper and so provided with a stinger 26 and cylinder 27 therefor, so that the stinger 26 may be extended by hydraulic pressure or the like against a stope floor or the like, to maintain the bit under pressure against the bottom of the hole. The impact machine M may also be provided with an air inlet 28, an air control valve having a handle 29, a water inlet 30, a water control valve having a handle 31, side rods 32 for assembly purposes, and a barrel 33, in which the machine chuck 14 rotates. The outside of chuck 14 is splined, for rotation by a chuck driver 34, which also rotates hammer 15 through a driver nut 35, driver 34 being rotated by a suitable air motor or the like, contained in machine M. It will be understood, of course, that the above parts are conventional, and that other machines differing in construction and operation may be utilized.

The shank 13 of chuck C is usually the same size and shape as the impact end 12 of the drill steel D, but the shank 13 may differ in size from the socket 11, as when the chuck may be made in different sizes for different sizes of drill steel. Also, the chuck C may be incorporated in the machine chuck 14, or the equivalent part of other machines, as by normally connecting passage 22 with socket 11, but providing a by-pass valve or similar means for discharging the water to one side rather than passing it through the drill steel, and also permitting the foreign material being removed to be discharged to the outside. However, due to the extremely rough usage to which practically all drilling apparatus is subjected, a separate auxiliary chuck for the removal of foreign material from drill steel will usually be found to be more satisfactory.

From the foregoing, it will be apparent that the method and apparatus of this invention fulfill to a marked degree the requirements and objects hereinbefore set forth. The device or auxiliary chuck of this invention, which, as indicated, may be incorporated in the chuck of a percussion machine, is readily inserted in the machine and little adjustment or repositioning of the machine is necessary, since the bit may be impacted against a plate, bar or the like, which is solidly backed, such as by being placed against a rock wall. Also, the chuck can be carried with the drill steel for each machine and very little time is required to clean any one drill steel. It is thus relatively easy to clean out a drill steel at any time it may become plugged, the time involved being not much greater than that necessary for replacing a plugged drill steel with an unplugged one.

It will be understood that, although one embodiment and a single variation thereof has been described, other embodiments and variations may exist, and that additional changes may be made, without departing from the spirit and scope of this invention.

What is claimed is:

1. A device for use in removing foreign material from the fluid passage of drill steel, such drill steel normally being provided at one end with a drill bit and being adapted to receive impacts at the opposite end from an impact machine and having a passage to receive flushing fluid, said device comprising a body adapted to receive the impact end of a drill steel and having a passage for discharge of removed foreign material; and a stem extending from said body and constructed and arranged to receive impacts from such impact machine, said stem having a passage for diverting said flushing fluid.

2. In drilling apparatus, a chuck provided with a socket for reception of the rear, impact end of a drill steel having a longitudinal passage tending to become clogged with foreign material, to which passage drilling fluid is normally supplied for flow to the forward end of said drill steel;

means for producing a succession of impacts against said chuck; means for diverting the fluid normally supplied to said longitudinal passage in said drill steel, to permit foreign material to move rearwardly and out of said longitudinal passage; and means for discharging such foreign material from said chuck.

3. In drilling apparatus, a chuck provided with a socket for reception of the rear, impact end of a drill steel having a longitudinal passage tending to become clogged with foreign material, to which passage drilling fluid is normally supplied for flow to the forward end of said drill steel, said chuck having a passage leading from the rear end of said socket for discharge of removed foreign material; means for producing a succession of impacts against said chuck; and means for diverting the fluid normally supplied to said longitudinal passage in said drill steel, to permit foreign material to move rearwardly and out of said longitudinal passage.

4. For use in combination with an impact machine and a drill steel adapted to receive impacts at the rear end and provided with a bit at the forward end, said drill steel also having a longitudinal passage for flow of drilling fluid to the forward end, such passage tending to become clogged by material being drilled, a chuck having means to receive the rear end of said drill steel, means for discharging removed foreign material and means for diverting such fluid, said chuck also being adapted to receive impacts at the rear end thereof.

5. For use in combination with an impact machine and a drill steel adapted to receive impacts at the rear end and provided with a bit at the forward end, said drill steel also having a longitudinal passage for flow of drilling fluid to the forward end, such passage tending to become clogged by material being drilled, a chuck having means to receive the rear end of said drill steel and means for discharging removed foreign material, said chuck also being adapted to receive impacts at the rear end thereof; and a cap for said bit adapted to permit said bit to be impacted against said cap with said cap placed against rock or the like, said cap preventing drilling into said rock by said bit.

6. The improvement defined in claim 5, wherein said chuck is also provided with means for diverting such fluid, and said cap is provided with side flanges adapted to extend about said bit.

7. A chuck for use in the removal of foreign material from the fluid passage of a drill steel, such passage extending longitudinally of such drill steel from the rear end to the forward end thereof, said chuck comprising a body having a socket for reception of the rear end of said drill steel and a passage leading from said socket for discharge of removed foreign material; and a stem extending rearwardly from said body and having a size and shape similar to the rear end of said drill steel, said stem having a longitudinally extending passage for fluid and said body having a fluid discharge passage connecting with and extending angularly to said stem passage.

8. A chuck for use in the removal of foreign material from the fluid passage of a drill steel, such passage extending longitudinally of such drill steel from the rear end to the forward end thereof, said chuck comprising a body having a socket for reception of the rear end of said drill steel and a passage leading from a point adjacent the rear end of said socket for discharge of material moving rearwardly into said socket from said drill steel passage; and a stem extending rearwardly from said body and having a size and shape similar to the rear end of said drill steel, said stem having a passage longitudinally extending for fluid and said body having a fluid discharge passage connecting with and extending angularly to said stem passage.

9. Apparatus for drilling and removing foreign material from the fluid passage of drill steel, such drill steel normally being provided at one end with a drill bit and being adapted to receive impacts at the opposite end from an impact machine and having a passage to receive flushing fluid, comprising an impact machine adapted to receive the impact end of such drill steel and to supply a flushing fluid to said drill steel passage during drilling, said machine producing impacts against the impact end of said drill steel during both drilling and the removal of foreign material; means for discharging foreign material from the impact end of said drill steel during removal of foreign material; and means for diverting said flushing fluid during such removal of foreign material, to permit such foreign material to move rearwardly and out of said drill steel passage.

ROBERT L. JONES.
HARRY O. NYLENE.

REFERENCES CITED

The following references are of record in the file of this patent:

UNITED STATES PATENTS

| Number | Name | Date |
|---|---|---|
| 766,588 | Brejcha | Aug. 2, 1904 |
| 1,084,152 | Kessel | Jan. 13, 1914 |
| 1,611,028 | Harrison | Dec. 14, 1926 |
| 1,953,095 | Baker | Apr. 3, 1934 |
| 2,038,134 | Schiffner | Apr. 21, 1936 |
| 2,145,262 | Hokanson | Jan. 31, 1939 |
| 2,359,971 | Curtis | Oct. 10, 1944 |